US008001529B2

(12) United States Patent
Babut et al.

(10) Patent No.: US 8,001,529 B2
(45) Date of Patent: Aug. 16, 2011

(54) SYSTEM AND METHOD OF TESTING WIRELESS COMPONENT APPLICATIONS

(75) Inventors: Alex Babut, Toronto (CA); Michael Shenfield, Richmond Hill (CA); Michael Shkolnik, Thornhill (CA)

(73) Assignee: Research In Motion Limited, Waterloo, Ontario (CA)

( * ) Notice: Subject to any disclaimer, the term of this patent is extended or adjusted under 35 U.S.C. 154(b) by 1340 days.

(21) Appl. No.: 11/405,508

(22) Filed: Apr. 18, 2006

(65) Prior Publication Data

US 2007/0037521 A1   Feb. 15, 2007

Related U.S. Application Data

(60) Provisional application No. 60/672,041, filed on Apr. 18, 2005.

(51) Int. Cl.
*G06F 9/44* (2006.01)
(52) U.S. Cl. .................. 717/124; 717/126; 717/131
(58) Field of Classification Search .................. None
See application file for complete search history.

(56) References Cited

U.S. PATENT DOCUMENTS

| 5,669,000 | A | * | 9/1997 | Jessen et al. .................. 717/127 |
| 5,928,369 | A | | 7/1999 | Keyser et al. |
| 2003/0140138 | A1 | | 7/2003 | Dygon et al. |

FOREIGN PATENT DOCUMENTS

| WO | WO 99/23849 | 5/1999 |
| WO | WO9923849 | 5/1999 |
| WO | WO 03/041422 | 5/2003 |
| WO | WO03/041422 A2 | 5/2003 |

OTHER PUBLICATIONS

Davies N et al: Evaluating a Location-Based Application: A Hybrid Test and Simulation Environment: Jul. 2004—whole document.
Satoh I—"Software Testing for Wireless Mobile Computing" Oct. 1, 2004 whole document.
PCT International Search Report and Written Opinion mailed Jul. 26, 2006 for corresponding PCT Application No. PCT/CA2006/000579.

* cited by examiner

*Primary Examiner* — Chuck O Kendall
(74) *Attorney, Agent, or Firm* — Gowling Lafleur Henderson LLP

(57) ABSTRACT

A test harness system and method of functionality testing of wireless component applications is provided. The test harness system comprises at least one testlet for testing at least one target application log event and at least one event handler for validating at least one comparator against the at least one target application log event. The method comprises the steps of listening for target application log events, receiving a target application log event, receiving a testlet and validating the target application log event based upon the testlet.

18 Claims, 13 Drawing Sheets

SYSTEM AND METHOD OF TESTING WIRELESS COMPONENT APPLICATIONS

This non-provisional application claims the benefit of U.S. Provisional Application No. 60/672,041 filed Apr. 18, 2005, which is hereby incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

The present patent disclosure relates generally to a communications system for providing communications to a plurality of devices and specifically to a system and method for testing wireless component applications.

BACKGROUND OF THE INVENTION

Due to the proliferation of wireless networks, there are a continually increasing number of wireless devices in use today. These devices include mobile telephones, personal digital assistants (PDAs) with wireless communication capabilities, two-way pagers and the like. Concurrently with the increase of available wireless devices, software applications running on such devices have increased their utility. For example, the wireless device may include an application that retrieves a weather report for a list of desired cities or an application that allows a user to shop for groceries. These software applications take advantage of the ability to transmit data of the wireless network in order to provide timely and useful services to users, often in addition to voice communication. However, due to a plethora of different types of devices, restricted resources of some devices, and complexity of delivering large amounts of data to the devices, developing software applications remains a difficult and time-consuming task.

Currently, devices are configured to communicate with Web services through Internet-based browsers and/or native applications. Browsers have the advantage of being adaptable to operate on a cross-platform basis for a variety of different devices, but have a disadvantage of requesting pages (screen definitions in HTML) from the Web service, which hinders the persistence of data contained in the screens. A further disadvantage of browsers is that the screens are rendered at runtime, which can be resource intensive. Applications for browsers are efficient tools for designing platform independent applications. Accordingly, different runtime environments, regardless of the platform, execute the same application. However, since difference wireless devices have different capabilities and form factors, the application may not be executed or displayed as desired. Further, browser-based applications often require significant transfer bandwidth to operate efficiently, which may be costly or even unavailable for some wireless devices.

On the other hand, native applications are developed for a specific wireless device platform, thereby providing a relatively optimized application program for a runtime environment running on that platform. However, a platform dependent application introduces several drawbacks, including having to develop multiple versions of the same application and being relatively large in size, thereby taxing memory resources of the wireless device. Further, application developers need experience with programming languages such as Java and C++ to construct such native applications.

Presently, there is little automated functionality testing done for wireless component applications. Due to the disparities in hardware and software between the various platforms, a generalized application is not a viable choice since it cannot easily (if at all) be adapted to the applications being tested. For wireless component applications, this problem is compounded by the fact that each application may be different. Unit testing that covers functionality on a per-module scale is employed, but is not relevant when the system as a whole is tested (each module can operate perfectly on its own, but create a disaster when linked with the rest). Manual testing by developers and testers is an effective way of finding bugs, but is by no means efficient. It is expensive, time-consuming and not very exhaustive. The present patent disclosure offers an alternate way of efficiently testing applications automatically and in an exhaustive fashion.

BRIEF DESCRIPTION OF THE DRAWINGS

An embodiment of the patent disclosure will now be described by way of example only with reference to the following drawings in which.

DETAILED DESCRIPTION OF THE PREFERRED EMBODIMENT

Figure 1:
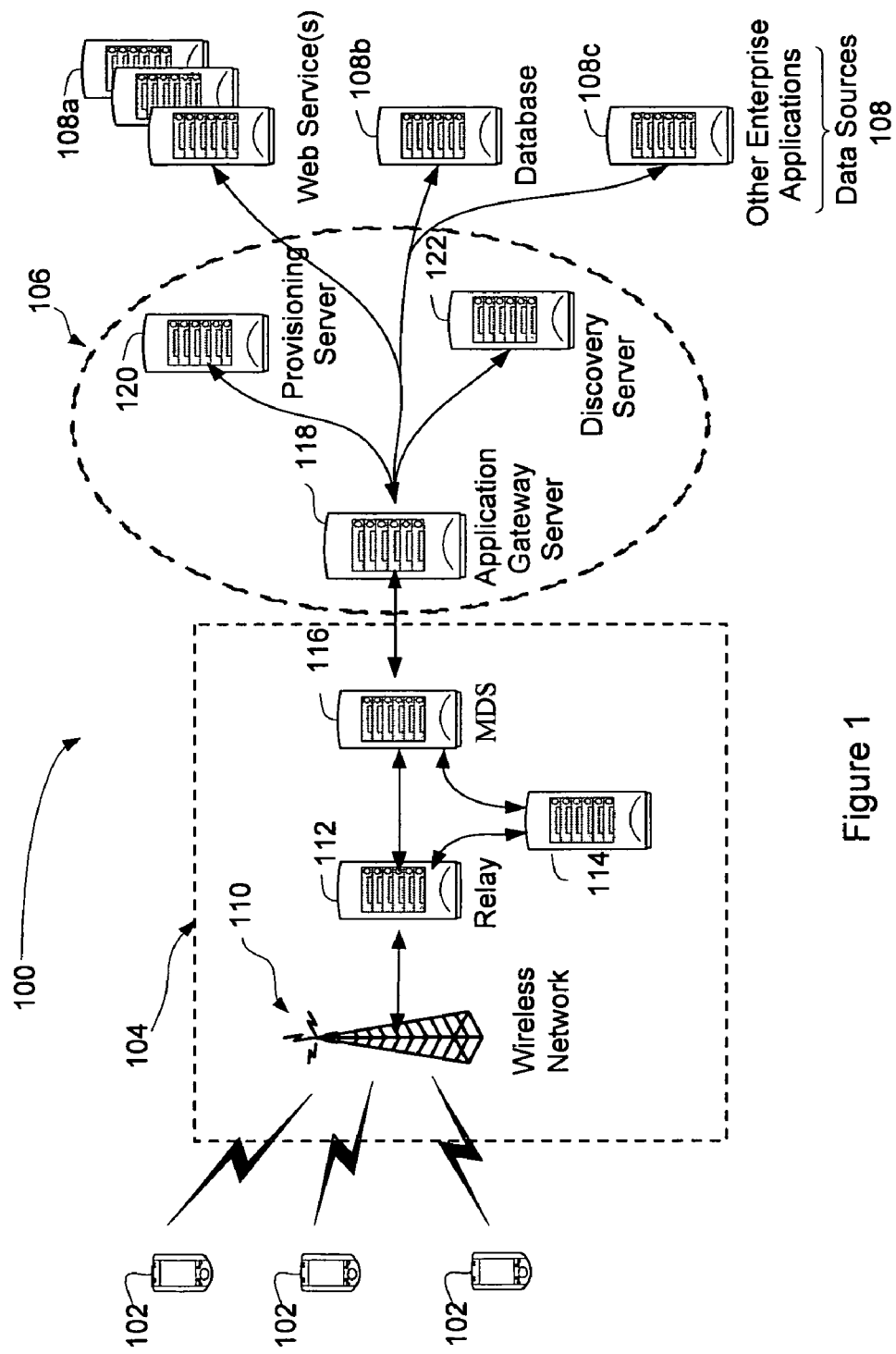
FIG. 1 is a schematic diagram of an example of a network facilitating wireless component applications.

The patent disclosure provides an innovative procedure for rigorous automated functionality testing of wireless component applications on small devices with limited resources.

In accordance with an embodiment of the present patent disclosure, there is provided a test harness system for functionality testing wireless component applications. The test harness system comprises at least one testlet for testing at least one target application log event and at least one event handler for validating at least one comparator against the at least one target application log event.

In accordance with another embodiment of the present patent disclosure, there is provided a method of functionality testing wireless component applications. The method comprises the steps of listening for target application log events, receiving a target application log event, receiving a testlet and validating the target application log event based upon the testlet.

In accordance with another embodiment of the present patent disclosure, there is provided a computer-readable medium storing instructions or statements for use in the execution in a computer of a method of automating functionality testing of wireless component applications. The method comprises the steps of listening for target application log events, receiving a target application log event, receiving a testlet and validating the target application log event based upon the testlet.

In accordance with another embodiment of the present patent disclosure, there is provided a propagated signal carrier carrying signals containing computer-executable instructions that can be read and executed by a computer. The computer-executable instructions are used to execute a method of automating functionality testing of wireless component applications. The method comprising the steps of listening for target application log events, receiving a target application log event, receiving a testlet and validating the target application log event based upon the testlet.

Advantageously, the test harness system reduces developer effort in creating code with which testing tools interface in order to obtain application state information (i.e., reduces or eliminates plug-in or hook-up points), allowing developers to write code without worrying about how the automated test tools will work with it.

A system and method of the present patent disclosure will now be described with reference to various examples of how the embodiments can best be made and used. For convenience, like reference numerals are used throughout the description and several views of the drawings to indicate like or corresponding parts, wherein the various elements are not necessarily drawn to scale.

Referring to FIG. 1, an example of a communication infrastructure is illustrated generally by numeral 100. The communication infrastructure 100 comprises a plurality of wireless devices 102, a communication network 104, an application gateway 106, and a plurality of back-end services 108.

The wireless devices 102 are typical personal digital assistants (PDAs), but may include other devices. Each of the wireless devices 102 includes a runtime environment capable of hosting a plurality of component applications.

Component applications comprise one or more data components, presentation components, and/or message components, which are written in a structured definition language such as Extensible Markup Language (XML) code. The component applications can further comprise workflow components which contain a series of instructions such as written in a subset of ECMAScript, and can be embedded in the XML code in some implementations. Therefore, since the applications are compartmentalized, a common application can be written for multiple devices by providing corresponding presentation components without having to rewrite the other components. Further, large portions of the responsibility of typical applications are transferred to the runtime environment for component application. Details of the component applications are further described below.

The wireless devices 102 are in communication with the application gateway 106 via the communication network 104. Accordingly, the communication network 104 may include several components such as a wireless network 110, a relay 112, a corporate server 114 and/or a mobile data server (MDS) 116 for relaying data between the wireless devices 102 and the application gateway 106.

The application gateway 106 comprises a gateway server 118 a provisioning server 120 and a discovery server 122. The gateway server 118 acts as a message broker between the runtime environment on the wireless devices 102 and the back-end servers 108. The gateway server 118 is in communication with both the provisioning server 120 and the discovery server 122. The gateway server 110 is further in communication with a plurality of the back-end servers 108, such as Web services 108a, database services 108b, as well as other enterprise services 108c, via a suitable link. For example, the gateway server 118 is connected with the Web services 108a and database services 108b via Simple Object Access Protocol (SOAP) and Java Database Connectivity (JDBC) respectively. Other types of back-end servers 108 and their corresponding links can be connected to the gateway server 118.

Preferably, each wireless device 102 is initially provisioned with a service book or IT policy facility to establish various protocols and settings, including connectivity information for the corporate server 114 and/or the mobile data server 116. These parameters may include a uniform resource locator (URL) for the application gateway server 118 as well as its encryption key. Alternatively, if the wireless device 102 is not initially provisioned with the URL and encryption key, they may be pushed to the wireless device 102 via the mobile data server 116. The mobile device 102 can then connect with the application gateway 106 via the URL of the application gateway server 118.

Figure 2:
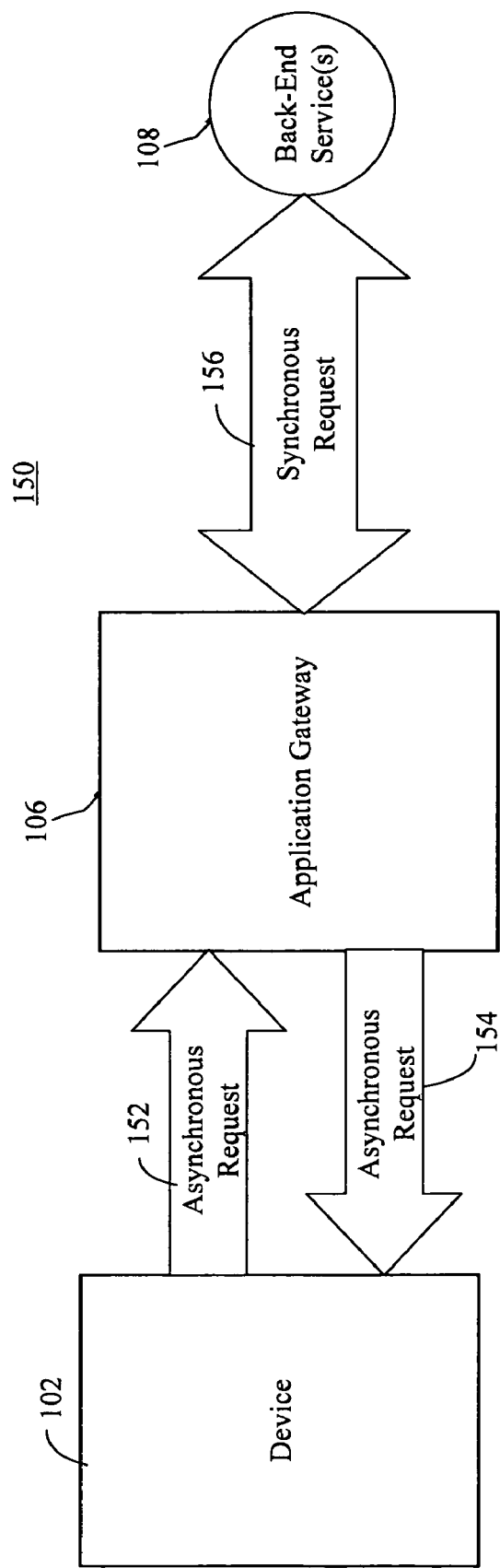
FIG. 2 shows in a flow diagram an example of a wireless component application communication model.

Referring to FIG. 2 there is illustrated in a flow diagram an example of a wireless component application communication model 150. From a high-level perspective, the overall wireless component application infrastructure 150 includes a wireless component application runtime environment (device RE) running on the device 102 and a wireless component application gateway (AG) 106 running on the server 118.

The AG 106 serves as a mediator between a wireless component application (sometimes referred to as application in this disclosure) executed by the RE and one or more back-end services 108 with which the application communicates. Often the back-end service is expected to be a Web service 108a using SOAP over HTTP or HTTPS as the transport protocol. As Web services are the most commonly expected back-end service 108, the term Web service is used interchangeable with back-end service 108 throughout this disclosure. However, it is appreciated that other types of back-end services can also be adapted to the disclosure. FIG. 2 exemplifies a synchronous link with a back-end service 108. However, it should be appreciated that the AG 106 can be in communication with back-end services 108 over asynchronous links.

The wireless component application communication model 150 is based upon asynchronous messaging paradigm. In this model the application gateway (AG) 106 establishes and mediates the connection between the device 102 and the back-end service(s) 108 to:

1. Achieve greater flexibility in resource management.
2. Provide reliable communication link between device 102 and back-end service 108 to handle situations when wireless coverage is unstable.
3. Efficiently distribute workload between device RE 102 and AG 106.

Figure 3:
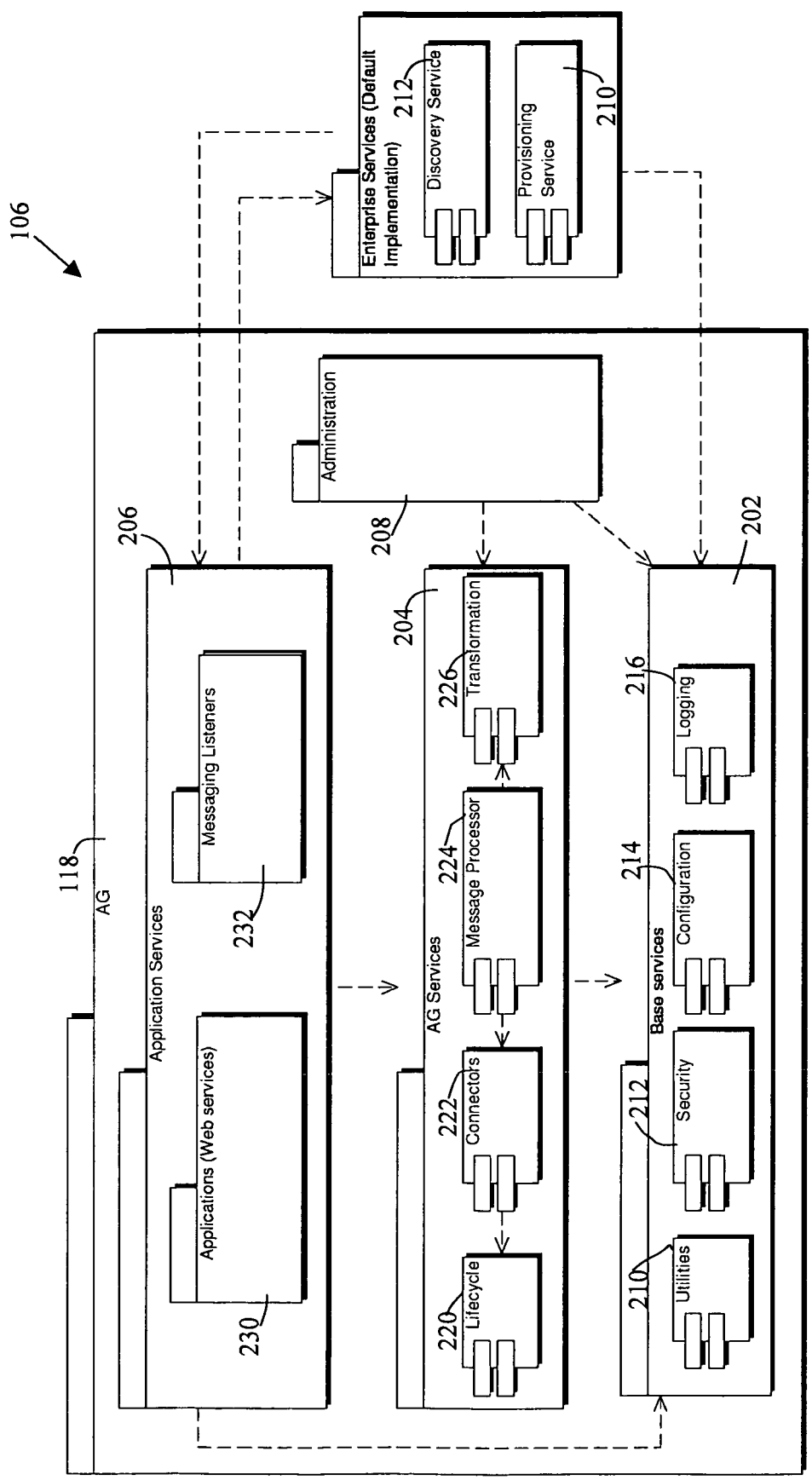
FIG. 3 shows in a detailed component diagram an example of the application gateway shown in FIG. 1.

Referring to FIG. 3, a more detailed view of an example of the application gateway 106 is shown. The application gateway server 118 includes three layers of service; a base services layer 202, an application gateway services layer 204 and an application services layer 206. The application gateway server 118 further includes an administration service 208.

A provisioning service 210 and a discovery service 212 are provided by the provisioning server 120 and discovery server 120, respectively.

At the lowest level, the base services layer 202 offers basic, domain-independent system services to other components in higher levels. Thus, for example, all subsystems in the application gateway services layer 204 and the application services layer 206 can utilize and collaborate with the subsystems in the base services layer 202. In the present embodiment, the base services layer 202 includes a utilities subsystem 210, a security subsystem 212, a configuration subsystem 214, and a logging subsystem 216.

The application gateway services layer 204 provides wireless component application domain-specific services. These services provide efficient message transformation and delivery to back-end services 108 and provide wireless device 102 and component application lifecycle management. In the present embodiment, the application gateway services layer 204 includes a lifecycle subsystem 220, a connector subsystem 222, a messaging subsystem 224, and a transformation subsystem 226.

The application services layer 206 sits at the top of the architecture and provides external program interfaces and user interfaces using subsystems provided by the lower layers. For example, various applications such as a service provider lifecycle application, a packaging application and a message listening application provide external program interfaces since they communicate primarily with applications on external systems. Similarly, an administration application provides a user interface by providing a user with the ability to access and potentially modify application gateway data and/or parameters.

The administration service 208 is responsible for administrative system messages, administration of the wireless devices 102, runtime administration of the application gateway subsystems, support and display system diagnostics, and administration of default implementations of the provisioning and discovery services.

The messaging listening application (or messaging listeners 232) provides an interface for receiving messages from the wireless devices 102 as well as external sources and forwarding them to the messaging subsystem. Further, the message listening application 232 typically authenticates that the source of the message is valid.

Figure 4:
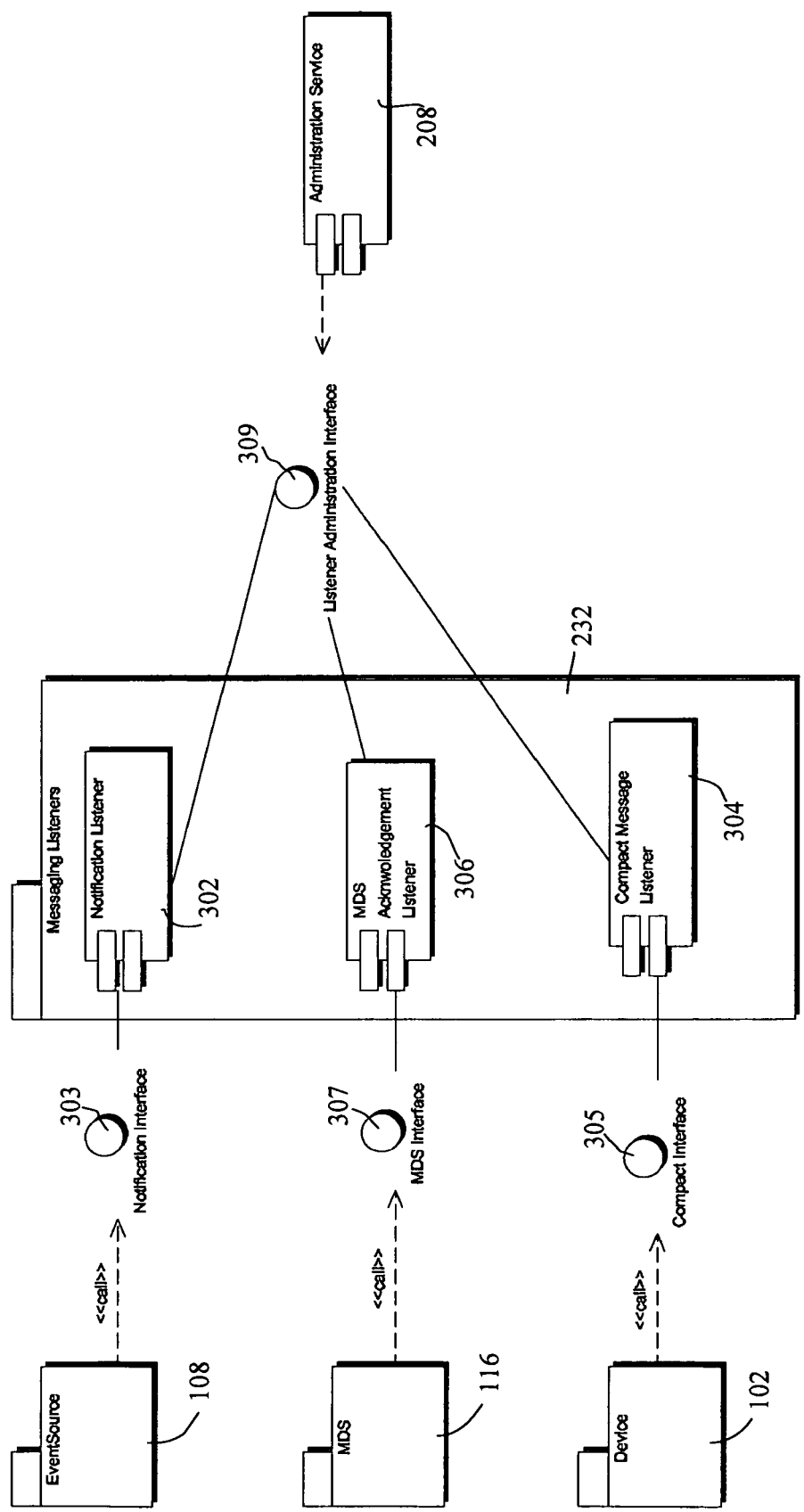
FIG. 4 shows in an interface diagram an example of a security subsystem.

Referring to FIG. 4, an example of the message listening application 232 is shown in greater detail. The message listening application 232 includes three listeners: a notification listener 302, a compact message listener 304, and a mobile data service acknowledgement listener 306. The notification listener 302 receives notification and response messages from event sources 108c via a notification interface 303. Other message listener interfaces may be added.

In one embodiment, the notification interface 303 may be implemented using Web Service (WS) Eventing. Web services often want to receive messages when events occur in other services, such as the event sources, and applications. A mechanism for registering interest is provided in the art by WS Subscription. WS Subscription defines a protocol for one Web service, referred to as a subscriber, to register interest with another Web service, referred to as an event source, for receiving messages about events, referred to as notifications. When the event source notifies the subscriber of an event, it is referred to as WS Eventing.

The compact message listener 304 receives messages from the mobile devices 102 via a compact message interface 305. The mobile data service acknowledgment listener 306 receives and acknowledges notifications from the mobile data service 116 via a mobile data service interface 307. Each of the three listeners 302, 304 and 306 receive administrative messages from the administration service 208 via a listener administrative interface 309.

In the present embodiment the listener interfaces 303, 305, 307, and 309 are configured using Hypertext Transfer Protocol/Hypertext Transfer Protocol over Secure Socket Layer (HTTP/HTTPS). However, these protocols have been selected as a design choice and other protocols may be used when desired. Accordingly, external systems transmit a HTTP/HTTPS request, which is received by the appropriate listener. The listener takes the message, makes minimal transformations, and forwards it to the messaging subsystem 224. The transformations include copying HTTP header information into message object fields. For example, the HTTP header information may identify the mobile data service 116 and wireless device 102 from which the message originated.

As previously described, the message listening application authenticates that the source of the message, be it the mobile data service 116, the wireless device 102 or event source 108, is valid.

Further, if reliable messaging is required, service availability is ensured and the listeners deal with solutions to availability attacks. In order to facilitate this, the messaging subsystem defines a threshold for a maximum number of messages and connections for a given time period from any back-end server 108, component application or wireless device. The administrator can modify this threshold as desired, as well as allow for specific exceptions via the administration service 208.

Further, since message interception and replay attack is possible, the listeners detect and prohibit this attack using mechanisms that identify replayed messages. These mechanisms typically include the use of a nonce. A nonce is defined as parameter that varies with time. A nonce can be a timestamp or other special marker intended to limit or prevent the unauthorized replay or reproduction of a message. Because a nonce changes with time, it can be used to determine whether or not a message is original, or a replay or reproduction of the original message. The use of a nonce for preventing interception and replay attacks is known in the art and need not be described in detail, as standard implementations are utilized.

Further, other technologies, such as sequencing, can also be used to prevent replay of application messages in addition to, or in lieu of, the time timestamp technique. Once again, such techniques are known in the art and need not be described in detail, as standard implementations are utilized.

Figure 5:
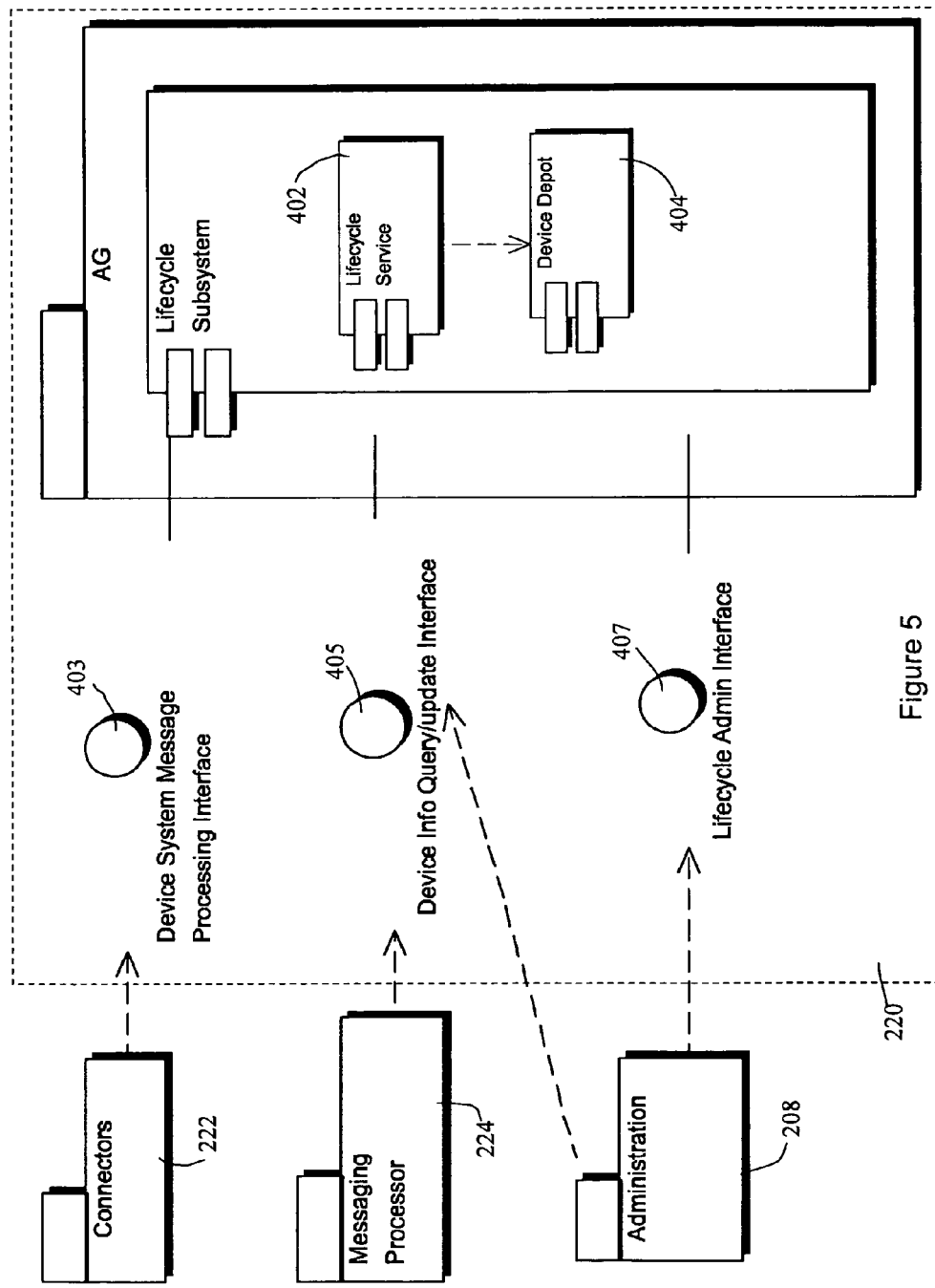
FIG. 5 shows in an interface diagram an example of the lifecycle subsystem in greater detail.

Referring to FIG. 5, an example of the lifecycle subsystem 220 is shown in greater detail. The lifecycle subsystem includes a lifecycle service 402 and a device depot 404.

The lifecycle service 402 processes device initiated messages that relate to the wireless device 104, the runtime environment lifecycle and the component application lifecycle. Such messages, for example, may relate to a wireless device registration or suspension, wireless device swap, wireless device availability, a component application installation, upgrade, or deletion, and runtime environment upgrades. These messages are communicated to and from the connector subsystem 222 via a device system message processing interface 403.

The lifecycle service 402 further provides the ability to query for wireless devices and component application using various filters. In order to facilitate this feature, the lifecycle service 402 communicates with the messaging subsystem 224 and the administration subsystem 208 via a device information query/update interface 405. In the present embodiment, the device information query/update interface 405 is implemented using a set of Java application program interfaces (APIs) for querying and updating device information. Typical interfaces include those for managing the wireless device's security and client administration policy.

The lifecycle subsystem 220 manages a security profile for each wireless device 104 registered with the application gateway 106 in the device depot 404. Each security profile includes a secure symmetric key for each device. This key is used for secure communication between the wireless device 104 and application gateway 106.

The client administration policy includes retrieving wireless device status, searching for component applications satisfying certain modifiable criteria, and searching for devices satisfying certain modifiable criteria. For example, it may be desirable to determine which component applications are installed on all the wireless devices or which wireless devices have specific component applications installed.

Yet further, a lifecycle administration interface 407 is provided for facilitating the management of the lifecycle subsystem 402 and the device depot 404 by the administration subsystem 208. For example, the administration subsystem can indicate the availability of a new version of a component application or the runtime environment.

Accordingly, the lifecycle service 402 manages the status of each of a plurality of assigned wireless devices 102, including the runtime environment and component applications stored therein. Information such as the runtime environment, component application status, and the wireless device security settings are stored in the device depot 404. The security settings may include, for example, client administration policy and the wireless device's encryption key.

The application gateway server 118 also allows for the use of third party lifecycle components, also referred to as lifecycle service providers, which are typically external to the application gateway 106. In order to facilitate lifecycle service providers, lifecycle service provider listeners are provided at the application services layer. The lifecycle service provider listeners are responsible for receiving notification on all lifecycle system messages from the lifecycle service providers and transmitting them to the administration subsystem 208 for processing. Further, the lifecycle service providers can access the administration service to configure the application gateway server 118 or send system messages.

Figure 6:
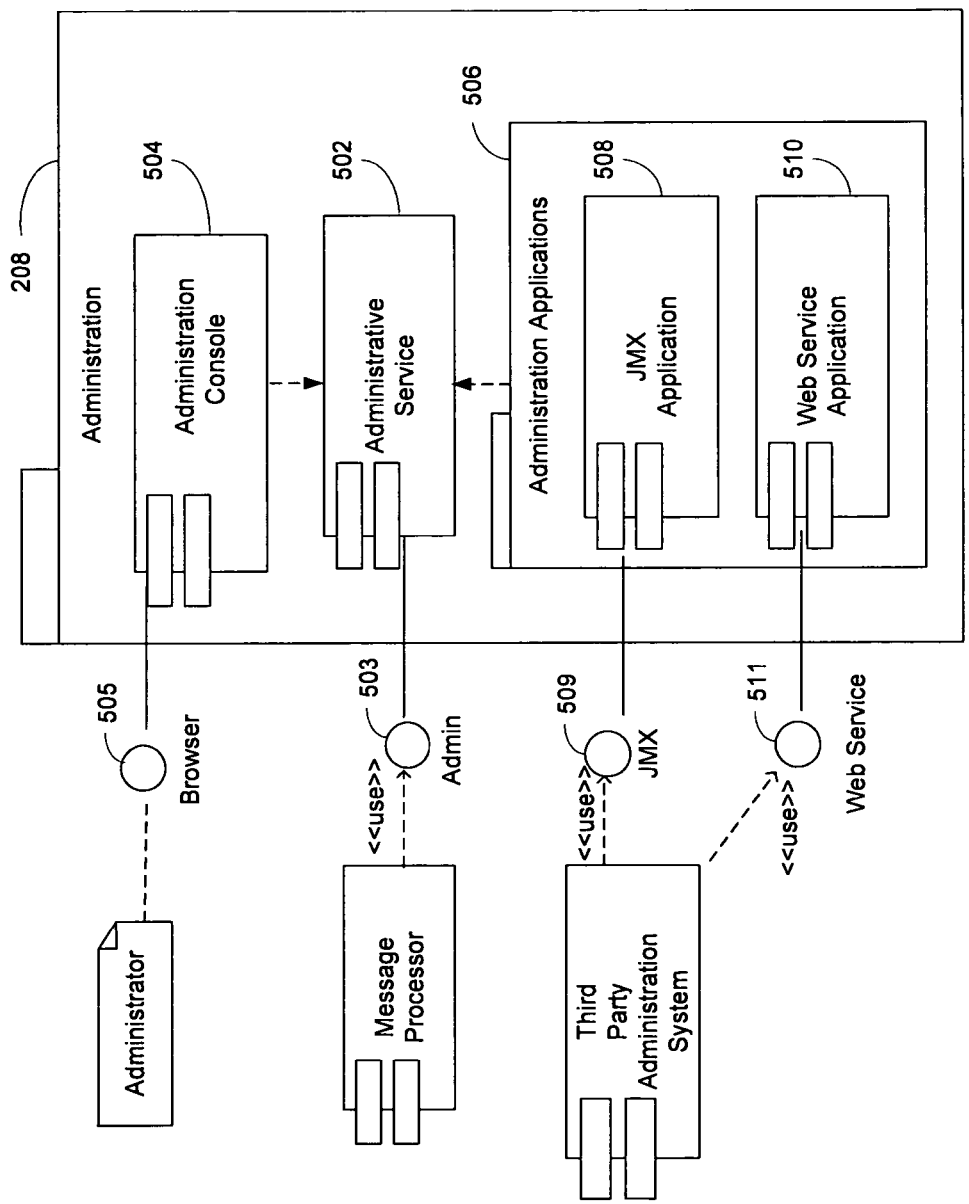
FIG. 6 shows in an interface diagram an example of the administration subsystem in more detail.

The administration subsystem 208 administers system messages, system devices, application gateway subsystems, system diagnostics, and default implementations of the provisioning and discovery services. Referring to FIG. 6, a more detailed view of an example of the administration subsystem 208 is shown. The administration subsystem 208 includes an administration service 502, an administration console 504 and administration applications 506. The administration applications 506 include a Java Management Extension (JMX) application 508 and a Web service application 510.

A browser interface 505 couples an administrator with the administrator console 502 for administrating the application gateway 106. An administrator interface 503 couples the administration service 502 with the messaging subsystem 224 for delivering administrative system messages. The administration applications 506 are coupled to their respective third party administrative applications via an appropriate interface. For example, the JMX application 508 is coupled via a JMX interface 509 and the Web service application 510 is coupled via a Web service interface 511.

The administration service 502 processes component application and runtime environment lifecycle events initiated by the administrator or the lifecycle service providers through the lifecycle administration interface. Examples of such events include installing a component application using push provisioning, refreshing the encryption key, upgrading the component application or runtime components, removing component applications, quarantining component applications and removing component applications from quarantine, applying component application cleanup script, querying the runtime environment for a status update, and updating the client administration policy.

The administration service 502 is also responsible for administration of the wireless devices 104. Accordingly, the administration service 502 is capable of responding to wireless device registration system messages and maintaining wireless device settings such as the security key, mobile data service URL, runtime version and status. The administration service 502 further supports the ability to list devices in accordance with predefined filter characteristics, such as querying a device for its component application and runtime environment settings and querying for component applications on specific devices.

The administration service 502 also provides the administrator with the ability to access application gateway subsystems runtime information and settings, per cluster node if applicable, and perform system-related tasks. Such tasks include viewing the message subsystem 224 runtime information, including message information per wireless device 12 and per component application, as well as the number of messages in queue, and a snapshot of the number of pooled objects of specific type. The administrator is able to modify specific settings at runtime as well as delete or reschedule expired messages.

Other information and settings provided by the administration service 502 include the following. The application gateway subsystem parameters are available for modification. Therefore, for example, the administrator can enable and disable various features at runtime. Database settings can be configured for a centralized application gateway database. This database may include all of the subsystem depots. The application gateway URLs can be configured to be accessible to external systems. For example, a URL may be assigned to the administration application 506 to allow access by third parties. Also a URL may be assigned to the packaging application to allow access by the provisioning service.

The administration service 502 may also store discovery service credentials, service provider credentials, mobile data service parameters and security parameters. The discovery service credentials can be used to authenticate the discovery service upon receiving a notification message that a component application is available. Similarly, service provider credentials, including its URL, can be used to authenticate a service provider upon receiving component application or runtime environment lifecycle messages. Mobile data service parameters can be used to connect the administrator to the mobile data service and include its IP address, user identification and password. The application gateway security parameters and settings, such as the application gateway public and private key and key refreshing policy, are used for encrypting communication between the application gateway and external applications.

The administration service 502 is also used for registering additional subsystems such as custom connectors and lifecycle listeners, for example.

The Web service application 510 uses Web services for directing service provider initiated system messages to the administration service 502 for processing and delivery to device, if required.

Similarly, the JMX application 508 directs service provider-initiated system messages to the administration service 502 for processing and delivery to device, if required. However, the JMX interface 509 is an open interface that any management system vendor can leverage. The administration infrastructure is based on JMX technology, which is an open technology for system management and monitoring. Each management system implements a set of Mbeans objects in order to be configurable. These objects must be registered with an MbeanServer running in the process space of the object, in accordance with JMX specification.

Since the application gateway 106 can potentially run in a distributed environment, that is some subsystems may run on different application servers, then each application server needs to have its own implementation of the MbeanServer. Further, each subsystem needs to be configured using a separate Administration Console provided by the corresponding application server, or using third party console that knows how to access the functionality provided by MbeanServer.

A runtime environment framework container is a client-resident container within which applications are executed on a device. The container manages the application lifecycle on the device (provisioning, execution, deletion, etc.) and is responsible for translating the metadata (XML) representing an application into an efficient executable form on a device. The container provides a set of services to the application, as well as providing support for optional JavaScript. These services include support for UI control, data persistence and asynchronous client-server messaging, etc.

Figure 7:
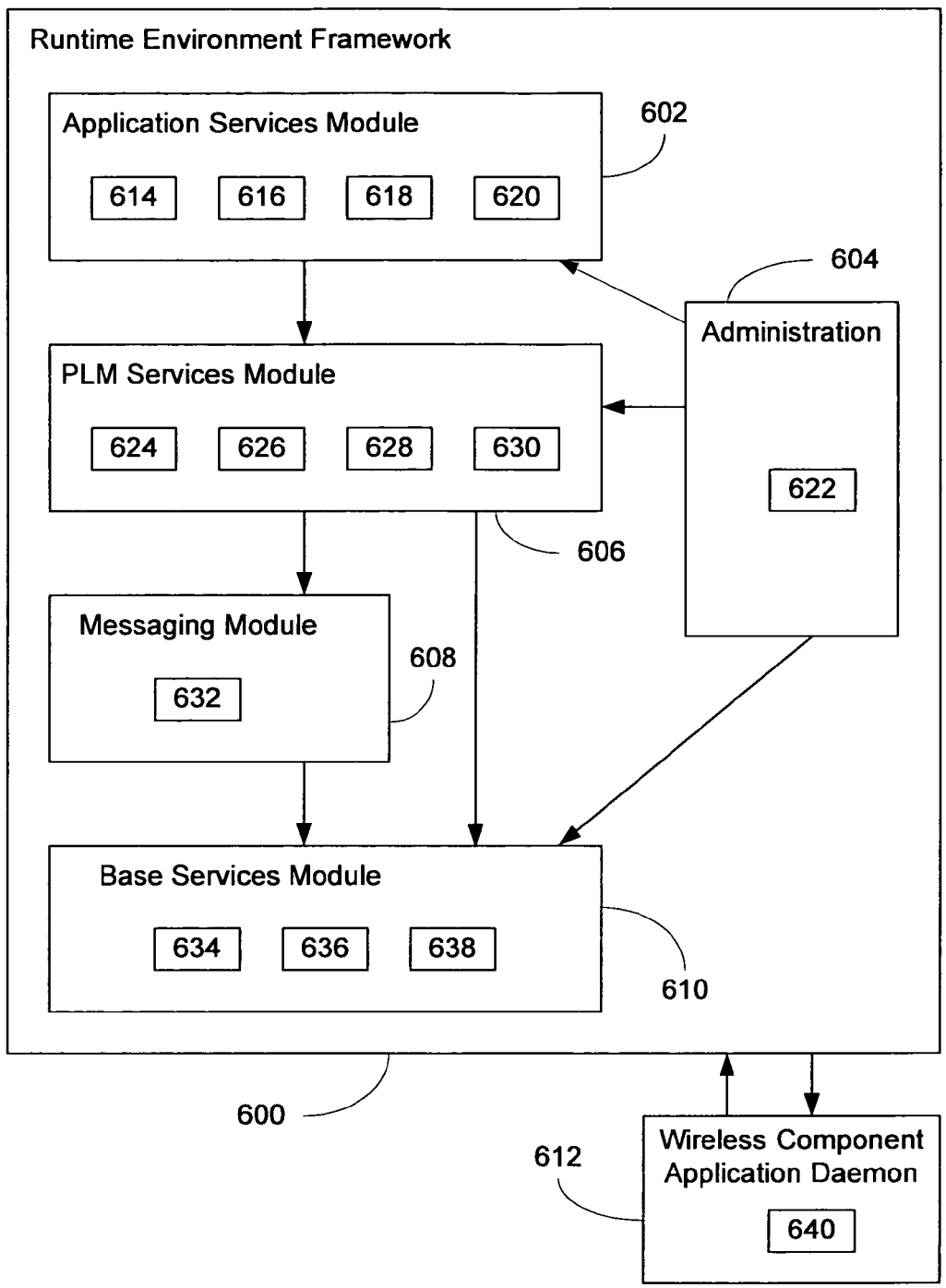
FIG. 7 shows in a component diagram an example of a runtime environment structure of the wireless component application.

FIG. 7 shows an example of a runtime environment framework 600. The runtime environment framework 600 comprises an application services module 602, an administration module 604, a provisioning and lifecycle management (PLM) services module 606, a messaging module 608, and a base services module 610. Components may be removed or added to the runtime environment framework 600. The runtime environment framework 600 communicates with a wireless component application daemon 612.

The application services module 602 includes a screen service 614 for providing an interface between currently running applications and a user, an interpreter service 616 for providing an execution environment for the applications, a metadata service 618 for handling and mediating application metadata related access, and an access service 620 for allowing applications to access other applications on the device 102.

The administration module 604 includes a control center 622 for handling a user interface of the wireless component application runtime environment framework 600, processing user interaction with the wireless component application runtime environment framework 600, and for integrating the wireless component application runtime environment framework 600 with the network system 100.

The PLM services module 606 includes a RE container 624 for coordinating RE container upgrades and backup/restore processes and for implementing a default error handling mechanism for the RE framework 600, a discovery service module 626 for locating applications in an application repository, a provisioning service 628 for application provisioning (including application downloads, installation and upgrades), and a lifecycle service 630 for registering, maintaining information for, and administrating applications.

The messaging module 608 includes a messaging service module 632 for message queuing, message (de)compacting, and message distribution.

The base services module 610 includes a persistence service 634 for storing a RE profile (including its version, directory, client administration policy, application administration policies, security keys, available upgrades, etc.), storing an application profile (including its version, metadata, application persistence data components, application persistable global data and application resource, available upgrades, etc.), and storing reliable messages (including outgoing messages pending delivery due to out of coverage, and incoming reliable messages pending processing). The base services module 610 also includes a securing service 636 for restricting access to RE services, providing message authentication, integrity, and encryption. The base services module 610 also includes a communication service 638 for sending and receiving messages in and out of the device 102, downloading resources and files from appropriate repositories, and notifying interested RE services about wireless coverage events.

The wireless component application daemon module 612 includes a daemon 640 for restarting the wireless component application process whenever it stops due to a fatal exception.

An innovative procedure for rigorous automated functionality testing of wireless component applications on small devices with limited resources is now described. Decoupling a test harness from an application being tested relies on logs. A test harness is an application external to the product being tested whose function is to provide access to its target's internal workings so they can be tested. It plugs into the target application at certain points and provides clearly defined inputs, then monitors the changes in the application's state and determines their validity.

Figure 8:
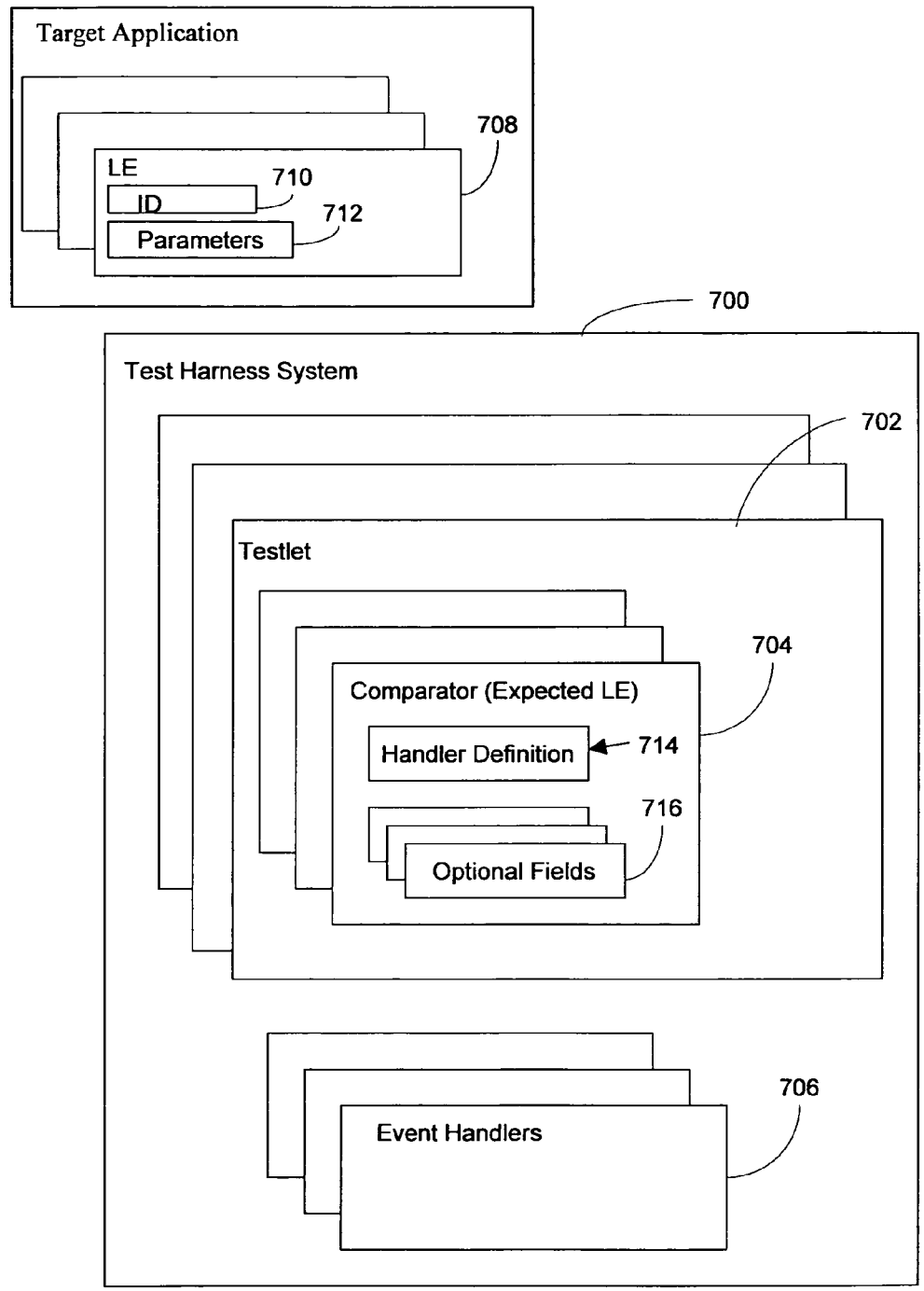
FIG. 8 shows in a component diagram an example of a test harness system for functionality testing wireless component applications, in accordance with an embodiment of the present patent disclosure.

FIG. 8 shows an example of a test harness system 700 for automating functionality testing of wireless component applications, in accordance with an embodiment of the present patent disclosure. The test harness system 700 comprises one or more testlets 702 for testing log events of a target application, and one or more event handlers 706 for validating a series of comparators. A testlet 702 includes one or more expected log events (LE) 708 for defining an expected target application logical flow, and one or more comparators 704 for holding information used to validate a step in a testing procedure. Item 708 is the expected log event defined in XML, which is later transformed into the test harness' internal representation of that information, item 704 or the comparator object (a Java object in one example of an implementation). An expected LE 708 includes an identifier for uniquely identifying the LE 708 (or expected LE 708), and one or more parameters for storing expected target application logical flow information. The parameters may contain any sort of information that helps to accurately represent the target application's current state. A comparator 704 includes a handler definition for associating the comparator with an event handler. A comparator 704 may also include option fields for storing additional information used to validate the target application's logical flow.

During development, coders typically log massive amounts of information that constantly paints a picture of the state of the currently running application. These log entries can be formatted concisely in any way that the developer chooses. In addition, an application's logging service (LS) would provide event notification to registered listeners every time a log event took place. Thus, a test harness system 700 may be implemented as a type of listener, which registers itself to receive any log events created by the target application (TA) during a test run. Preferably, an XML-based benchmark (testlet 702) for comparing the incoming events is used to validate the TA's execution flow. If there is any discrepancy between the functionality application's flow defined in the testlet 702 and the sequence of log events received from the TA, the test is considered failed, otherwise passed. Preferably, testlets 702 are kept current with respect to functionality changes that take place in the TA.

Testlets 702 are entities that comprise a sequence of LEs 708 that are expected to appear logged by the TA. Preferably, testlets are defined using XML. Each expected LE 708 (defined as a test "step" in the testlet 702) has a unique identifier 710 along with additional information in the form of several parameters 712, and optionally, a precondition in the form of another step that must have occurred before it. The test harness system 700 uses this script as the expectation of the TA's functionality flow.

The harness is modularized in the sense that its event comparison logic is managed by event handlers (EH) 706 which deal with the particular functionality comparison requirements of various events occurring in the TA. Thus, for a particular test case, only the required handlers 706 are loaded, reducing the resource footprint of the test harness system 700 to a minimum.

The modular decoupled test harness system 700 introduces the following new concepts and advantages to testing wireless component applications:

- reduces development team effort in implementing testing solutions—reuses applications' existing logging mechanisms and developers only have to log certain LEs 708 required by the testing team at the point where they occur in the TA's logical flow;
- entirely decoupled from TA;
- rigorous testing ability—developers can add as much information to LEs 708 as they wish in order to test their applications;
- tiny resource footprint on platform—only uses the EH 706 required by a particular test case; and
- extendable—if new functionality is added to application, developers simply add a new LE 708, and the testers define a corresponding step in their testlets (a new EH can be created if required).

The test harness system 700 operates with the introduction of several artifacts, including a wireless component target application (TA) and its logging service (LS), testlets 702, event handlers 706, and a test server.

The modular test harness system 700 may be applied to many wireless component application test needs. The harness system 700 is modular and highly adaptable to almost any test scenario due to the high customizability of its event handlers. It is also has a minimal impact on the TA's code since there are no hook-in points required.

Figure 9:
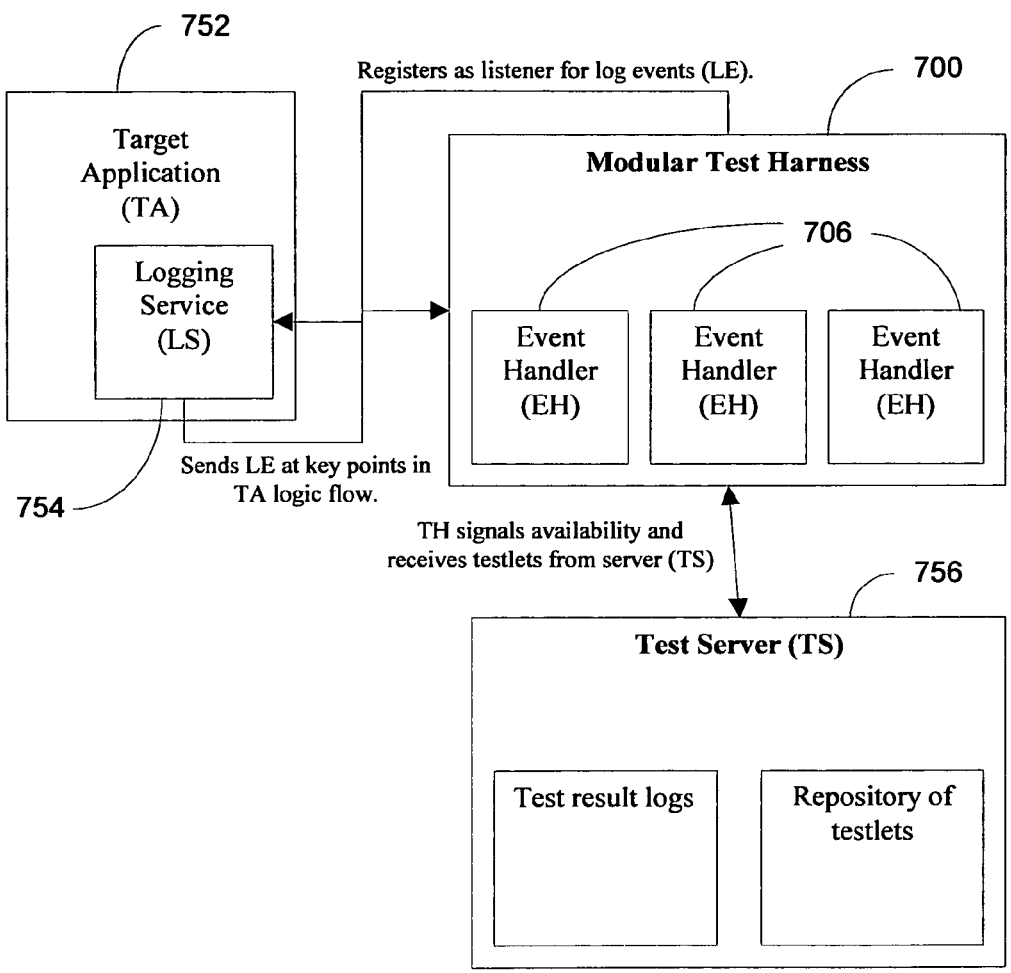
FIG. 9 shows in a diagram an example of a framework within which the test harness system works, in accordance with an embodiment of the test harness system.

FIG. 9 shows in a diagram an example of a framework within which the test harness system 700 works, in accordance with an embodiment of the test harness system 700. The wireless component application is the target application (TA) 752 of the testing harness system 700. It incorporates an event-based logging service 754 and is not limited to a certain class of applications. Events are logged throughout the execution flow of the TA 752 when it has reached certain states that are of concern to testers. Preferably, it runs wholly unaware and independent of the test harness system 700.

The wireless component application (or TA 752) creates its log of events in a format defined by testers. The testers and developers agree on the format of the LE message beforehand. The corresponding expected LE 708 is then written in XML to match the structure of the LE coming from the application—basically they comprise the same parameters 712 and IDs 710. The TA 752 and TH 700 are unaware of the format in which information is exchanged between them, as long as the expected event format matches that of the incoming events; this is where the flexibility lies. The logging service 754 creates a log event when the TA 752 logs information corresponding to reaching a new state in its execution flow.

Testlets 702 are XML definitions of the logical steps that the TA 752 follows in order to successfully complete a test case (a small subsection of its functionality being currently tested). Preferably, testlets 702 are loaded by the TH 700 one case at a time for memory efficiency and contain a combination of comparators (XML elements that define the expected results of a test) 704 and simulated input that will continue driving the TA 752 to obtain further results. The simulated input commands follow the successful validation of a comparator 704 and its definition is a child of that comparator 704.

Comparators 704 are entities that contain parameterized baseline information about the expected behaviour of the TA 752. They contain one mandatory field, their handler 714 definition, which indicates which of the TH EHs 706 will use that comparator 704 to perform event validation. In addition they may contain several optional fields 716. One optional field 716 may be a precondition definition, which is a definition of another event that has previously occurred in the test flow and its validation is necessary for the successful validation of the current event. A second type of optional field 716 may be parameter fields, which contain additional information about an event in the form of name-value pairs. They are all successfully validated according to the handler's particular event handling logic in order for the step to pass. To maintain test flexibility, some parameters that appear in the LE 708 may be omitted and they will be ignored when validating the event. Another optional field 716 is a command definition, which describes simulated input that the TH 700 will issue to the TA 752 upon the successful validation of the current step.

Commands are child elements of comparator steps 704 that contain high-level definitions of user input that will be simulated on the TA 752 by the TH 700 upon the successful validation of the comparator object to which they belong. Commands are used to advance the logical flow of the TA 752 in order to generate further LE 708.

Event handlers 706 are responsible for successfully validating a series of comparators 704 that are assigned to them according to their specific comparison logic. Each test uses as many handlers 706 as it needs to satisfy the specific comparison requirements of the steps (or LEs 708) in a particular test case. They are loaded and unloaded for each test case in order to reduce the TH's (700) memory footprint.

The test server (TS) 756 is responsible for managing test suite assignments to THs 700 that are available to perform tests and for storing the result logs received after a test case is completed. It is also responsible for compacting testlets 702 and performing any mappings that are necessary so they can validate the TA's 752 incoming log events properly.

One object of the test harness system 700 centers around functionality testing small device applications that require a significant amount of their platform's resources. Such applications tend to be mostly synchronous in terms of input-output sequences and as such their log events will arrive in a predictable, sequential fashion. Thus, the TH 700 preferably maintains a minimal presence by employing a simple handler 706 that will validate test steps in sequence.

Figure 10:
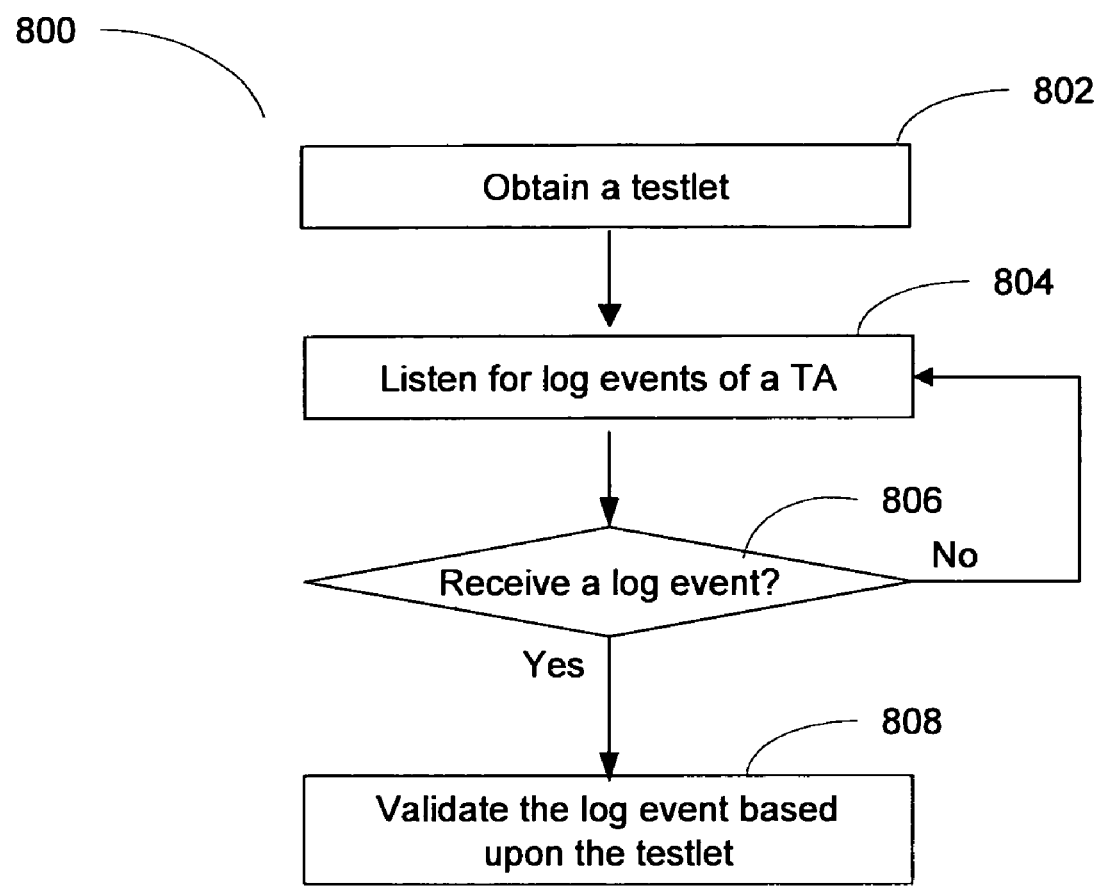
FIG. 10 shows in a flowchart an example of a method of functionality testing wireless component applications, in accordance with an embodiment of the test harness system.

FIG. 10 shows in a flowchart an example of a method of functionality testing wireless component applications (800), in accordance with an embodiment of the test harness system 700. The test harness obtains a testlet 702 (802) and preloads all the necessary information inside the event handlers 706. Then the test harness system 700 begins with listening for log events of a TA 752 (804). The testlet may be obtained from the test server 756 or stored locally on the test harness system 700. Once the test harness system 700 has a log event from a TA 752 (806), the log event is validated using the corresponding comparator 704 in the loaded testlet (808).

Figure 11:
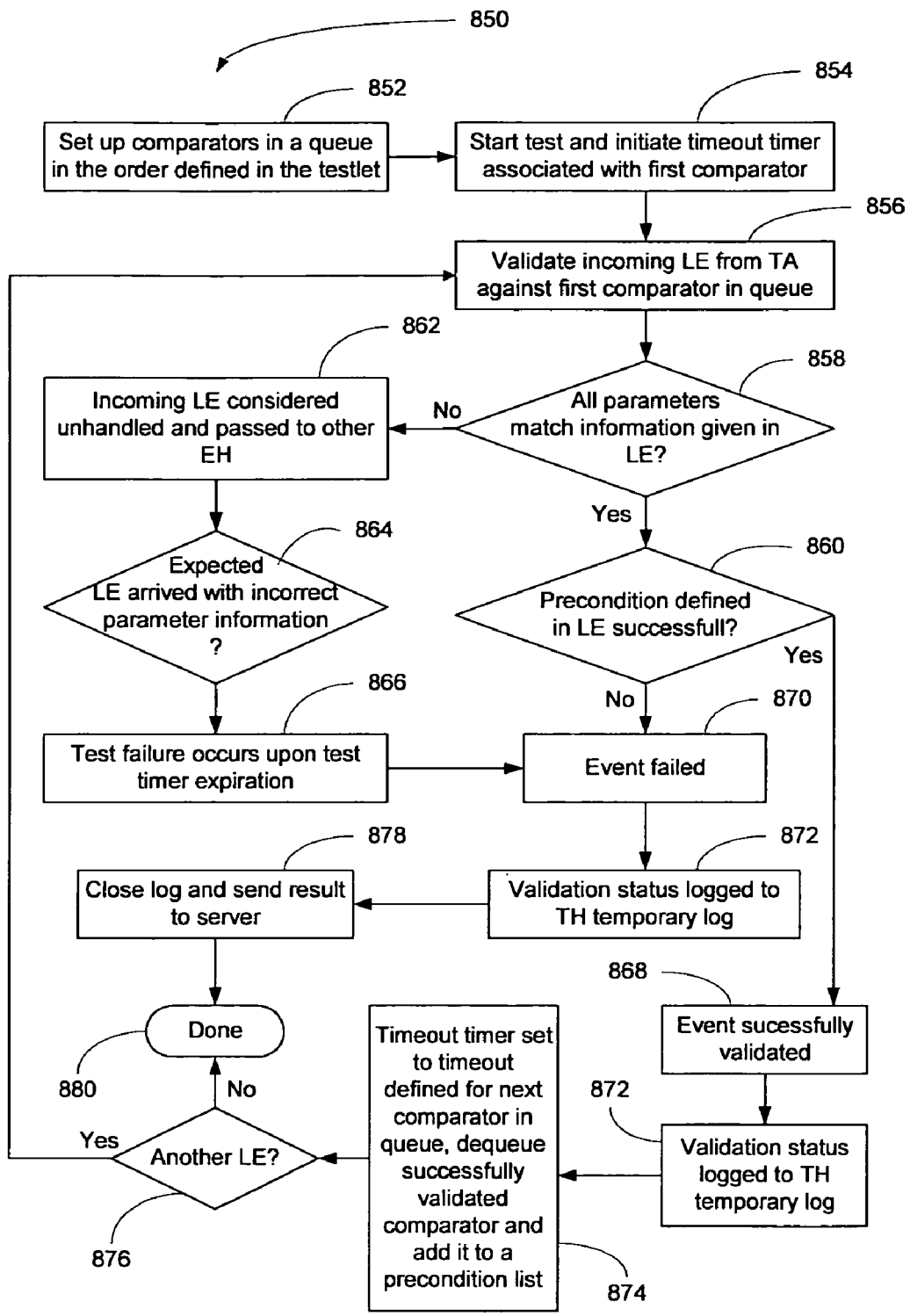
FIG. 11 shows in a flowchart an example of another method of functionality testing wireless component applications, in accordance with an embodiment of the test harness system.

Before a case can be tested, an event handler 706 is created or reused. In this case, its logic would follow the steps as shown in flowchart provided in FIG. 11 of another example of a method of functionality testing wireless component applications (850), in accordance with an embodiment of the test harness system 700 (the flow presented is for the logic employed immediately after the testlet 702 is received from the server and the XML code is sent to the EH 706 for parsing).

The method (850) begins with comparators 704 set up in a queue following the order of steps defined in the testlet 702 (852). Next, a test is started and a timeout timer associated with the first comparator 704 is initiated (854). An incoming log event from the TA 752 is validated against the first comparator in queue (856). If all parameters match the information given in the log event (858), then a precondition event, if defined in the step (or LE 708), is checked to see if it has occurred successfully (860). Otherwise if one or more parameters do not match the information given in the log event (858), then an incoming log event is considered unhandled and passed to other EHs 706, if present, for validation (862). If the expected LE 708 arrived with incorrect parameter 712 information (864), test failure occurs upon its timer expiring (866) since no handler validated it successfully. If step (860) is satisfied, the event is considered successfully validated (868). For all the other conditions, it is considered failed (870). Validation status is logged to a temporary log of the TH 700 (872). If validation was successful (868), the timeout timer is set to the timeout defined for the next comparator in the queue; the successfully validated one is dequeued and added to a precondition list (874). It may now act as a valid precondition for other events. If there is another incoming log event (876), step (856) is repeated. Otherwise (876), the method is done (880). If validation failed (870), the result is logged, the log is closed and the result is sent to the server (878). The test ends (880). After the EH 702 has been properly implemented and tested, it is ready to be used for all test cases that will be validated using its logic.

Figure 12:
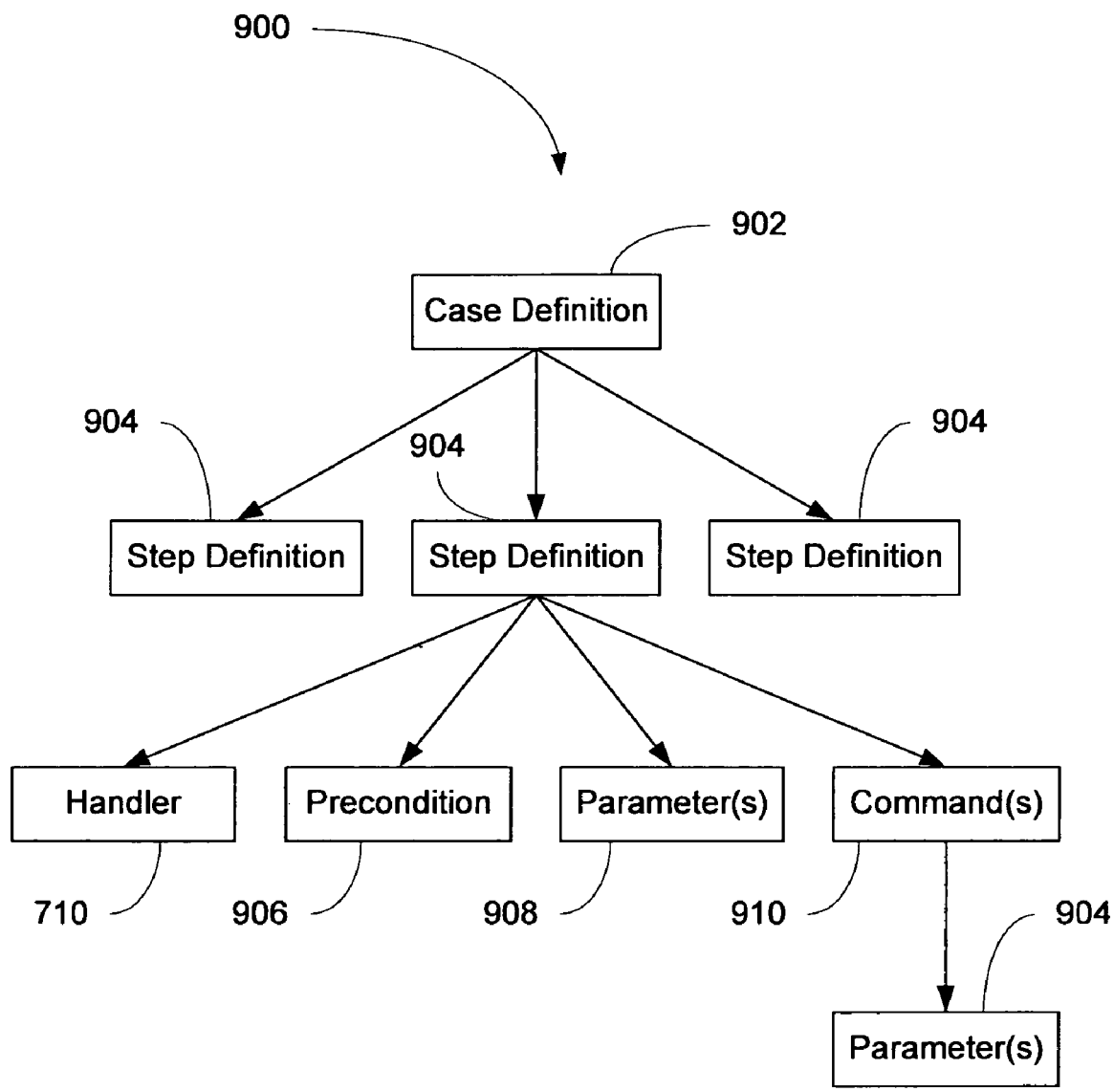
FIG. 12 shows in a tree structure an example of a testlet structure, in accordance with an embodiment of the test harness system.

A testlet 702 is an XML document defining a set of expected test results (LEs 708) against which the TH 700 will use to validate incoming log events. FIG. 12 shows in a tree structure an example of a testlet structure 900, in accordance with an embodiment of the test harness system 700. The testlet structure 900 comprises a case definition 902, which includes one or more step 708 definitions 904. Each step definition 904 comprises a handler 710, an optional field 712 including a precondition 906, one or more parameter(s) 908, and one or more command(s) 910. Each command 910 includes one or more parameters 908.

The following is an example of a testlet definition, in accordance with an embodiment of the testlet structure 900.

1. Case definition: root of testlet, contains one required attribute.
    1.1.1. Name: name of the test case defined by testlet; should be unique.
    1.2. Step definitions: children of case, at least one must be defined. Each test step represents a comparator object in the TH's internal EH. Steps have two required attributes:
        1.2.1. id: unique identifier associated with a corresponding log event
        1.2.2. timeout: identifies how many seconds the TH should wait for an exact-match LE before failing the validation.
    1.3. Handler definition: child of step, must be defined. Identifies which TH EH will perform comparisons based on the current comparator definition.
    1.4. Precondition definition: child of step, optional. Identifies a previously occurred LE that has successfully validated that must have occurred before the current event in order for it to be validated. It is used as a mechanism that ensures proper sequencing of application logic for asynchronous applications.
    1.5. Parameter definition: child of step, optional. Defines additional information about an event that should be used by event handlers in validating the LE. May cause the EH to look for all or some of the information coming from the LE. Contains one required attribute.
        1.5.1. id: name of the parameter whose value is found in the parameter element
    1.6. Command definition: child of step, optional. Defines a simulated input command that should be issued immediately after the successful validation of the current comparator. Contains one required attribute.
        1.6.1. desc: attribute of command, identifies the command
        1.6.2. param: child element of command, provides additional information that is used to modify the basic command (i.e., shift or alt status modifiers that accompany the command).

An example of a sample testlet implementation, in accordance with an embodiment of the test harness system 700, is provided below that illustrates the structure presented above.

```
<case desc="New Testlet">
    <step id="0" timeout="30" continueAfterFail="false">
        <handler>DefaultStrictHandler</handler>
        <command desc="Start a wiclet">
            <param id="COMMAND_START_WICLET"/>bushism
            </param>
        </command>
    </step>
    <step id="1401" name="Wiclet started" timeout="30">
        <handler>DefaultStrictHandler</handler>
        <param id="Wiclet_ID">-2739759394304175306</param>
        <param id="Wiclet_URI">/bushism</param>
    </step>
    <step id="1407" name="Wiclet Admin Policy received" timeout="30" continueAfterFail="false">
        <handler>DefaultAsynchronousHandler</handler>
        <precond>
            <step id="1401" name="Wiclet started" timeout="30">
                <handler>DefaultStrictHandler</handler>
                <param id="Wiclet_ID">-2739759394304175306</param>
                <param id="Wiclet_URI">/bushism
                </param>
            </step>
        </precond>
        <param id="Wiclet_ID">-2739759394304175306</param>
        <param id="Wiclet_URI">Research_In_Motion.com/bushism
        </param>
    </step>
    <step id="501" name="Screen pushed" timeout="30" continueAfterFail="false">
        <handler>DefaultStrictHandler</handler>
        <param id="Screen_ID">scr_Main</param>
        <param id="Layout_Type">2</param>
        <command desc="Trackwheel Click">
            <param id="COMMAND_CLICK" />
        </command>
    </step>
    <step id="802" name="Outgoing wiclet message" timeout="30" continueAfterFail="false">
```

```
        <handler>DefaultStrictHandler</handler>
        <param id="Wiclet_ID">-2739759394304175306</param>
        <param id="Message_ID">2</param>
        <param id="AG_ID">-482370271514247927</param>
        <param id="Reliable">DELIVERY_MODE_STANDARD</param>
    </step>
    <step id="301" name="Request queued for send" timeout="30"
continueAfterFail="false">
        <handler>DefaultStrictHandler</handler>
        <param id="Position_In_Queue">0</param>
        <param id="Message_Size">25</param>
    </step>
    <step id="304" name="Request queue empty" timeout="30"
continueAfterFail="false">
        <handler>DefaultStrictHandler</handler>
    </step>
    <step id="603" name="Resource read" timeout="30"
continueAfterFail="false">
        <handler>DefaultStrictHandler</handler>
        <param id="Resource_URL">envlp4.png</param>
    </step>
    <step id="501" name="Screen pushed" timeout="30"
continueAfterFail="false">
        <handler>DefaultStrictHandler</handler>
        <param id="Screen_ID">scr_MessageSent</param>
        <param id="Layout_Type">2</param>
    </step>
    <step id="603" name="Resource read" timeout="30"
continueAfterFail="false">
        <handler>DefaultStrictHandler</handler>
        <param id="Resource_URL">envlp3.png</param>
    </step>
    <step id="501" name="Screen pushed" timeout="30"
continueAfterFail="false">
        <handler>DefaultStrictHandler</handler>
        <param id="Screen_ID">scr_inGetRandomBushismResponse
        </param>
        <param id="Layout_Type">2</param>
        <command desc="Trackwheel Click">
            <param id="COMMAND_CLICK" />
        </command>
    </step>
    <step id="502" name="Menu invoked" timeout="30"
continueAfterFail="false">
        <handler>DefaultStrictHandler</handler>
        <param id="Menu_ID">33</param>
        <param id="Number_Of_Items">1</param>
        <command desc="Trackwheel Roll">
            <param id="COMMAND_ROLL_DOWN">5</param>
        </command>
        <command desc="Trackwheel Click">
            <param id="COMMAND_CLICK" />
        </command>
    </step>
    <step id="1402" name="Wiclet stopped" timeout="30"
continueAfterFail="false">
        <handler>DefaultStrictHandler</handler>
        <param id="Wiclet_ID">-2739759394304175306</param>
        <param id="Wiclet_URI">Research_In_Motion.com/bushism
        </param>
    </step>
</case>
```

Testing an asynchronous wireless component application is similar to testing a synchronous application. The mechanics of creating handlers and defining testlets with the expected results remain, but the logic of the test flow is altered to take into account the asynchronous nature of the application being tested. This form of testing is particularly suited to Web service-based applications.

Figure 13:
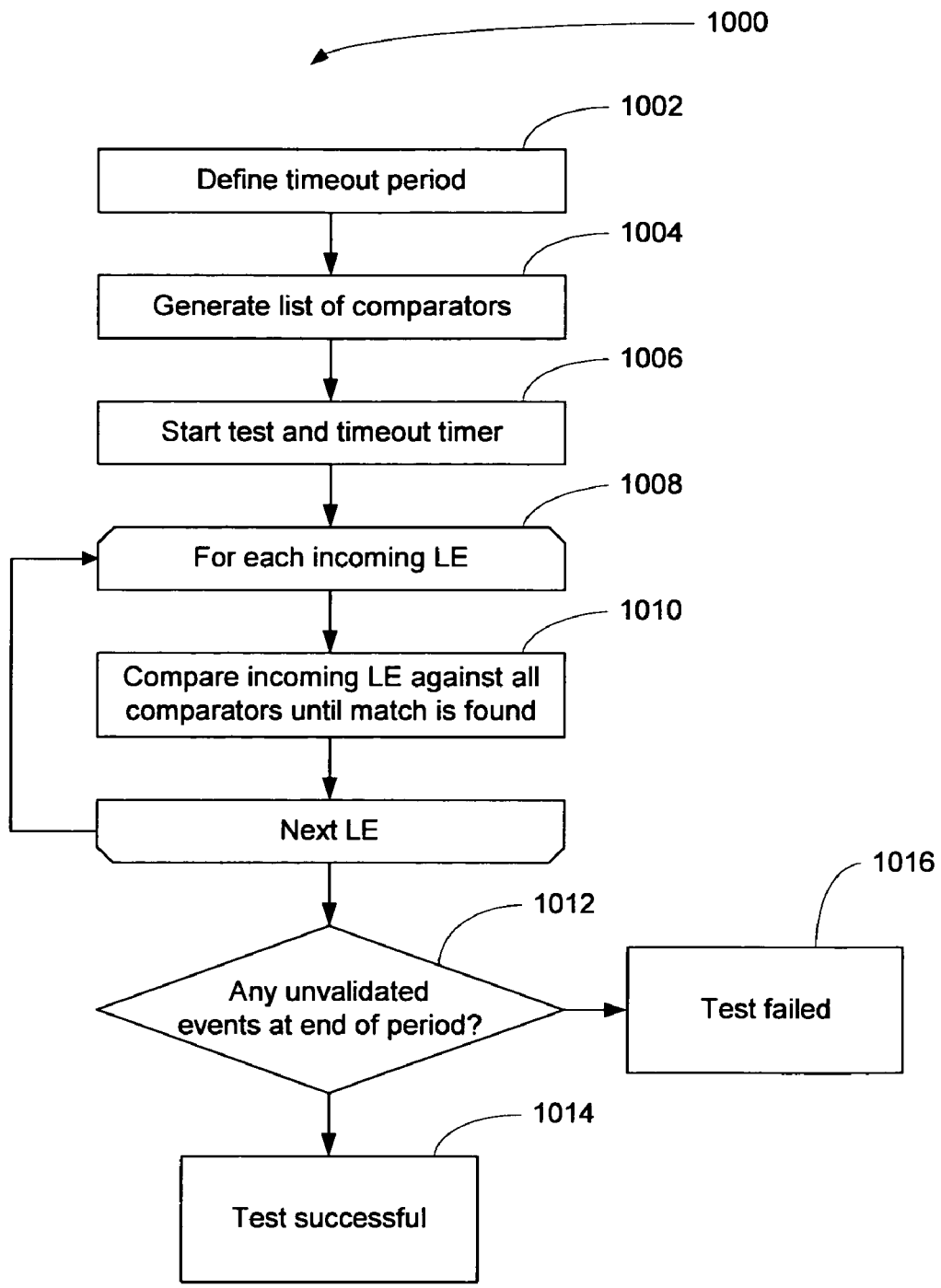
FIG. 13 shows in a flowchart an example of another method of functionality testing wireless component applications, in accordance with an embodiment of the test harness system.

For asynchronous applications, two handlers are used. One has been defined in FIG. 11, as described above. A second, a handler for asynchronous events is defined below. FIG. 13 shows in a flowchart another example of a method of functionality testing wireless component applications (1000), in accordance with an embodiment of the test harness system 700. As before, the logic flow presented from a testlet 702 has been received by the TH 700 from the TS 756 and the corresponding steps are passed to the EH 706 for parsing.

The method (1000) begins with defining a timeout period in which all events must have occurred (1002). If any are left un-validated at the end of this period (1012), the test is considered failed (1016). Next, a list of comparator events is generated (1004) based on steps associated with the asynchronous handler in the testlet 702. The test and handler timeout timer are started (1006). For each incoming log event (1608), the log event is compared against all comparators 704 in the list until a match is found (1010). The comparison logic is the same as that defined in steps (856) to (866) above. The test is considered successful if all asynchronous comparators have been successfully validated against incoming log events during the handler's timeout period (1014).

The testlet definition for an asynchronous application may follow the same syntactic structure defined above. However, the precondition tag is used to order the TH's 700 expected logic flow to match the TA's 752 where asynchronous events are concerned. Consider a set of events, A, B, C, ..., G, H that is expected from the TA 752. Let events, C, D, E, G be asynchronous, but C, D and E must only be issued after synchronous events A and B have occurred. Since preconditioning is implicit for synchronous events, its definition is only a formality. However, to ensure that events C, D and E arrive from the TA 752 at the proper time, they must be explicitly preconditioned with event B. Otherwise, they may be validated for containing the correct information, but their time of arrival may be logically incorrect as far as the TA 752 is concerned.

An example testlet is provided below that uses asynchronous events. The response from the server and the incoming message are asynchronous events that may occur at any time after the sending of the request depending on Web service's Quality of Service (QoS), i.e., the average time in which the Web service can provide the requested information.

```
<case desc="New Testlet">
    <step id="0" timeout="30" continueAfterFail="false">
        <handler>DefaultStrictHandler</handler>
        <command desc="Start a wiclet">
            <param id="COMMAND_START_WICLET">/AQuote</param>
        </command>
    </step>
    <step id="1401" name="Wiclet started" timeout="30"
continueAfterFail="false">
        <handler>DefaultStrictHandler</handler>
        <param id="Wiclet_ID">4681829582212566094</param>
        <param id="Wiclet_URI">Research_In_Motion.com/AQuote</param>
    </step>
    <step id="1407" name="Wiclet Admin Policy received" timeout="30"
continueAfterFail="false">
        <handler>DefaultStrictHandler</handler>
        <precond>
            <step id="1401" name="Wiclet started" timeout="30">
                <handler>DefaultStrictHandler</handler>
                <param id="Wiclet_ID">-
                2739759394304175306</param>
                <param id="Wiclet_URI">/bushism</param>
            </step>
        </precond>
        <param id="Wiclet_ID">4681829582212566094</param>
        <param id="Wiclet_URI">Research_In_Motion.com/AQuote</param>
    </step>
    <step id="501" name="Screen pushed" timeout="30"
continueAfterFail="false">
        <handler>DefaultStrictHandler</handler>
        <param id="Screen_ID">scr_Main</param>
        <param id="Layout_Type">2</param>
```

-continued

```
            <command desc="Trackwheel Click">
                <param id="COMMAND_CLICK"/>
            </command>
        </step>
        <step id="802" name="Outgoing wiclet message" timeout="30" continueAfterFail="false">
            <handler>DefaultStrictHandler</handler>
            <param id="Wiclet_ID">4681829582212566094</param>
            <param id="Message_ID">2</param>
            <param id="AG_ID">-2857534396031158848</param>
            <param id="Position_In_Queue">1</param>
            <param id="Reliable">DELIVERY_MODE_STANDARD</param>
        </step>
        <step id="301" name="Request queued for send" timeout="30" continueAfterFail="false">
            <handler>DefaultStrictHandler</handler>
            <param id="Request_ID">-737979528</param>
            <param id="Position_In_Queue">0</param>
            <param id="Message_Size">24</param>
        </step>
        <step id="501" name="Screen pushed" timeout="30" continueAfterFail="false">
            <handler>DefaultStrictHandler</handler>
            <param id="Screen_ID">scr_MessageSent</param>
            <param id="Layout_Type">2</param>
        </step>
        <step id="302" name="Request processed" timeout="30" continueAfterFail="false">
            <handler>DefaultAsynchronousHandler</handler>
            <precond>
                <step id="802" name="Outgoing wiclet message" timeout="30">
                    <handler>DefaultStrictHandler</handler>
                    <param id="Wiclet_ID">4681829582212566094</param>
                    <param id="Message_ID">2</param>
                    <param id="AG_ID">-2857534396031158848</param>
                    <param id="Position_In_Queue">1</param>
                    <param id="Reliable">DELIVERY_MODE_STANDARD</param>
                </step>
            <param id="Request_ID">-737979528</param>
            <param id="Server_Reply">200</param>
        </step>
        <step id="801" name="Incoming wiclet message" timeout="30" continueAfterFail="false">
            <handler>DefaultAsynchronousHandler</handler>
            <precond>
                <step id="802" name="Outgoing wiclet message" timeout="30">
                    <handler>DefaultStrictHandler</handler>
                    <param id="Wiclet_ID">4681829582212566094</param>
                    <param id="Message_ID">2</param>
                    <param id="AG_ID">-2857534396031158848</param>
                    <param id="Position_In_Queue">1</param>
                    <param id="Reliable">DELIVERY_MODE_STANDARD</param>
                </step>
            </precond>
            <param id="Wiclet_ID">4681829582212566094</param>
            <param id="Message_ID">1</param>
            <param id="AG_ID">-2857534396031158848</param>
            <param id="Position_In_Queue">1</param>
            <param id="Reliable">DELIVERY_MODE_STANDARD</param>
        </step>
        <step id="809" name="Message removed from queue" timeout="30" continueAfterFail="false">
            <handler>DefaultStrictHandler</handler>
            <precond>
                <step id="801" name="Incoming wiclet message" timeout="30">
                    <handler>DefaultAsynchronousHandler</handler>
                    <param id="Wiclet_ID">4681829582212566094</param>
                    <param id="Message_ID">1</param>
                    <param id="AG_ID">-2857534396031158848</param>
                    <param id="Position_In_Queue">1</param>
                    <param id="Reliable">DELIVERY_MODE_STANDARD</param>
                </step>
            </precond>
            <param id="Wiclet_ID">4681829582212566094</param>
            <param id="Message_ID">1</param>
            <param id="Queue_ID">4681829582212566094</param>
            <param id="Pending_Wiclet_Message_Count">0</param>
        </step>
        ...
</case>
```

The systems and methods according to the present patent disclosure may be implemented by any hardware, software or a combination of hardware and software having the above described functions. The software code, either in its entirety or a part thereof, may be stored in a computer-readable memory. Further, a computer data signal representing the software code which may be embedded in a carrier wave may be transmitted via a communication network. Such a computer-readable memory and a computer data signal are also within the scope of the present patent disclosure, as well as the hardware, software and the combination thereof.

While particular embodiments of the present patent disclosure have been shown and described, changes and modifications may be made to such embodiments without departing from the true scope of the patent disclosure.

What is claimed is:

1. A test harness system for automating functionality testing of wireless component applications, the test harness system comprising:
    a computer processor listening and receiving a target application log event;
    wherein the computer processor executes a testlet and orders in a queue, comparators received from the testlet;
    a timeout timer associated with a comparator of the comparators, and
    an event handler validating the target application log event against the comparator.

2. The test harness system as claimed in claim 1, wherein the comparators form a series of comparators.

3. The test harness system as claimed in claim 1, wherein the target application log event comprises:
    an identifier uniquely identifying the target application log event; and
    a parameter storing expected target application logical flow information describing a current state of the target application.

4. The test harness system as claimed in claim 3, wherein the target application log event further comprises a precondition for determining a precondition log event to occur before the target application log event.

5. The test harness system as claimed in claim 1, wherein the comparator comprises a handler definition associating the comparator with the event handler.

6. The test harness system as claimed in claim 5, wherein the comparator comprises a precondition definition of a precondition log event that has occurred.

7. The test harness system as claimed in claim 5, wherein the comparator comprises a parameter field storing additional information about the target application log event.

8. The test harness system as claimed in claim 7, wherein the additional information in the parameter field is in the form of name-value pairs.

9. The test harness system as claimed in claim 5, wherein the comparator comprises a command definition describing simulated input that the test harness system issues to the target application upon successful validation of the testlet.

10. The test harness system as claimed in claim 1, further comprising a test server for managing test suite assignments to the test harness system, the test server including:
 a test result log storing results of testlets; and
 a repository storing testlets.

11. The test harness system as claimed in claim 1, further comprising a logging service of a target application for generating log events when the target application logs information.

12. A method of automating functionality testing of wireless component applications, the method comprising:
 listening, in a computer processor, for target application log events;
 receiving a target application log event;
 receiving a testlet;
 ordering in a queue, comparators received from the testlet;
 initiating a timeout timer associated with a first comparator of the comparators; and
 validating the target application log event against the first comparator.

13. The method as claimed in claim 12, wherein the validating the target application log event comprises determining if all parameters match information given in the target application log event.

14. The method as claimed in claim 12, further comprising logging a validation status of the target application log event based upon the results of the validating the target application log event.

15. The method as claimed in claim 12, further comprising:
 dequeing a successfully validated comparator; and
 adding the successfully validated comparator to a precondition list.

16. The method as claimed in claim 12, further comprising:
 resetting the timeout timer for a second comparator; and
 validating the log event against the second comparator.

17. The method as claimed in claim 12, wherein a plurality of log events are validated asynchronously.

18. A computer-readable memory storing instructions or statements for use in the execution in a computer of a method of automating functionality testing of wireless component applications, the method comprising:
 listening for target application log events;
 receiving a target application log event;
 receiving a testlet;
 ordering in a queue, comparators received from the testlet;
 initiating a timeout timer associated with a first comparator of the comparators; and
 validating the target application log event against the first comparator.

\* \* \* \* \*